2,750,393
Patented June 12, 1956

2,750,393
IODINATED 5-BENZAMIDOTETRAZOLES AND PREPARATION THEREOF

Bill Elpern, Albany, N. Y., assignor to Sterling Drug Inc., New York, N. Y., a corporation of Delaware No Drawing. Application December 1, 1954, Serial No. 472,511

22 Claims. (Cl. 260—308)

This invention relates to iodinated 5-benzamidotetrazoles, to salts thereof and to a process for their preparation. The compounds of the invention have the following general formula:

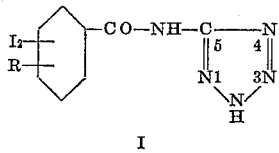

I wherein R is selected from the class consisting of hydrogen, iodine, hydroxy and lower-alkoxy groups.

My new compounds possess a high weight percentage of iodine, ranging from about 54% to 67%, and therefore are useful as X-ray contrast agents. In particular the compounds are useful as cholecystographic agents, and they are relatively non-toxic.

The new iodinated 5-benzamidotetrazoles contain at least two iodine atoms as substituents in the benzene ring. A third substituent may be present in the benzene ring, and this additional substituent can be a third iodine atom or a hydroxy or lower-alkoxy group. If a lower-alkoxy group is present it preferably contains from one to about four carbon atoms and thus includes such groups as methoxy, ethoxy, propoxy, isopropoxy, butoxy, isobutoxy, tertiary-butoxy and secondary-butoxy. The substituents in the aromatic ring can be in any of the possible positions relative to one another and to the amide grouping.

The compounds of the invention are prepared by heating an acid halide of a benzoic acid having the formula

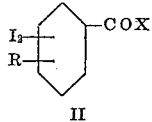

II wherein X is chlorine or bromine, with 5-aminotetrazole in an inert solvent. The conditions under which the reaction takes place are not critical, the preferred temperature range being anywhere from about 50° C. to 150° C. The acid halides used as reactants are prepared from the corresponding benzoic acids, a known class of compounds, by reaction with thionyl chloride, thionyl bromide or other agents known to convert acids to acid halides.

The compounds of Formula I are acidic in nature, and the hydrogen in the 1-position can be replaced by cations derived from inorganic or organic bases thus forming water-soluble salts, and these salts are within the purview of the invention. The preferred types of salts are those derived from bases whose cations are relatively non-toxic to the animal organism. Appropriate bases are the alkali metal hydroxides, such as sodium and potassium hydroxide, ammonium hydroxide, and basic organic amines such as ethylamine, diethylamine, diethanolamine, N-methylglucamine, and the like. These reagents produce the sodium, potassium, ammonium, ethylammonium, diethylammonium, diethanolammonium and N-methylglucammonium salts, respectively.

When used as cholecystographic agents, the compounds of the invention are administered orally in either the free acid or salt form, or intravenously in the salt form. When used intravenously, the compounds are dissolved in water or other physiologically acceptable aqueous medium.

The following examples will further illustrate the invention.

EXAMPLE 1

5-(2,5-diiodobenzamido)tetrazole

A mixture of 49 g. of 2,5-diiodobenzoic acid, 50 cc. of thionyl chloride and 50 cc. of petroleum ether (Skellysolve B) was refluxed gently on a steam bath for two hours. The solvent was removed in vacuo on a steam bath, and the residue was crystallized from carbon tetrachloride, collected by filtration and washed with petroleum ether, giving 42 g. of 2,5-diiodobenzoyl chloride, M. P. 90–91° C.

A solution of 42 g. of 2,5-diiodobenzoyl chloride in 125 cc. of benzene was added to 8.5 g. of 5-aminotetrazole, and the mixture was refluxed for 21 hours. The solid material which separated upon cooling was collected by filtration and washed with ether. The 42 g. of material thus obtained was dissolved in dilute sodium hydroxide solution, decolorized with activated charcoal, the clarified solution containing the sodium salt of 5-(2,5-diiodobenzamido)tetrazole was acidified and the product collected by filtration, giving 23.5 g. of 5-(2,5-diiodobenzamido)tetrazole, M. P. above 300° C.

*Analysis.*—Calcd. for $C_8H_5I_2N_5O$: C, 21.78; H, 1.14; I, 57.57. Found: C, 21.77; H, 1.33; I, 57.90.

When administered intravenously as the sodium salt to cats in a dose of 200 mg./kg. of body weight, 5-(2,5-diiodobenzamido)tetrazole caused the gall bladder to be outlined in X-ray photographs.

EXAMPLE 2

5-(2,3,5-triiodobenzamido)tetrazole

A mixture of 29 g. of 2,3,5-triiodobenzoic acid, 50 cc. of thionyl chloride and 50 cc. of petroleum ether (Skellysolve B) was refluxed for 2 hours. The solvent was removed and the residue crystallized from carbon tetrachloride, giving 30 g. of 2,3,5-triiodobenzoyl chloride, M. P. 85–88° C.

A solution of 30 g. of 2,3,5-triiodobenzoyl chloride and 5.1 g. of 5-aminotetrazole in 500 ml. of dry benzene was refluxed for 24 hours. The solid material which separated upon cooling was collected by filtration and washed with petroleum ether (Skellysolve B). The 31 g. of material thus obtained was dissolved in dilute sodium hydroxide solution and decolorized with activated charcoal, the clarified solution was acidified with dilute hydrochloric acid, and the product collected by filtration and washed with water. The latter product was suspended in hot alcohol, collected by filtration, washed with acetone and further purified by dissolving in dilute sodium hydroxide, decolorizing and acidifying. There was thus obtained 23 g. of 5-(2,3,5-triiodobenzamido)tetrazole, M. P. 306° C. (dec.).

*Analysis.*—Calcd. for $C_8H_4I_3N_5O$: C, 16.94; H, 0.71; I, 67.17. Found: C, 16.74; H, 0.84; I, 66.30.

EXAMPLE 3

5-(3,4,5-triiodobenzamido)tetrazole

A mixture of 43.4 g. of 3,4,5-triiodobenzoic acid, 240 ml. of thionyl chloride and 85 ml. of dry benzene was refluxed for 4 hours. The solvent was removed in vacuo on a steam bath, and the residue was recrystallized from benzene giving 37 g. of 3,4,5-triiodobenzoyl chloride, M. P. 136–139° C.

A mixture of 21 g. of 3,4,5-triiodobenzoyl chloride, 3.4 g. of 5-aminotetrazole and 300 cc. of dry benzene was refluxed for 24 hours. The material which separated upon cooling was collected by filtration and stirred with dilute sodium hydroxide solution. The material which failed to dissolve was removed by filtration and consisted of 9 g. of unreacted chloride. The alkaline filtrate was acidified with acetic acid and the product was collected and given a second alkaline treatment with dilute sodium hydroxide solution, using activated charcoal for decolorizing purposes. The alkaline solution was acidified and the product collected and dried, giving 5-(3,4,5-triiodobenzamido)-tetrazole, M. P. above 300° C.

*Analysis.*—Calcd. for $C_8H_4I_3N_5O$: C, 16.95; H, 0.71; I, 67.2. Found: C, 17.26; H, 0.94; I, 66.7.

EXAMPLE 4

*5-(2-hydroxy-3,5-diiodobenzamido)tetrazole*

A mixture of 61.6 g. of 2-hydroxy-3,5-diiodobenzoic acid, 300 cc. of thionyl chloride and 150 cc. of petroleum ether (Skellysolve B) was refluxed for 3 hours. The solvent was removed, and the residue was recrystallized from petroleum ether (Skellysolve C), giving 55.5 g. of 2-hydroxy-3,5-diiodobenzoyl chloride, M. P. 90° C.

5-aminotetrazole (6.1 g.) was added to a solution of 29.4 g. of 2-hydroxy-3,5-diiodobenzoyl chloride in 500 cc. of dry benzene, and the mixture was refluxed for 24 hours. The solid material which separated upon cooling was collected by filtration, washed with water and then suspended in water containing a slight excess of sodium hydroxide. The insoluble material was removed by filtration and the filtrate was acidified with acetic acid. The precipitate was collected by filtration and further purified by dissolving in dilute sodium hydroxide solution, decolorizing with activated charcoal, and acidifying the filtered solution. The product was collected by filtration and dried in a vacuum oven at 110° C., giving 5-(2-hydroxy-3,5-diiodobenzamido)tetrazole, M. P. 234.5–235° C. (dec.).

*Analysis.*—Calcd. for $C_8H_5I_2N_5O_2$: C, 21.02; H, 1.10; I, 55.5. Found: C, 20.96; H, 1.30; I, 55.3.

EXAMPLE 5

*5-(3,5-diiodobenzamido)tetrazole*

A mixture of 32 g. of 3,5-diiodobenzoic acid, 75 cc. of thionyl chloride and 100 cc. of petroleum ether (Skellysolve B) was refluxed for three hours. The solvent was removed in vacuo and the residue was crystallized from a carbon tetrachloride-petroleum ether (Skellysolve A) mixture, giving 32.5 g. of 3,5-diiodobenzoyl chloride.

A mixture of 32 g. of 3,5-diiodobenzoyl chloride, 7.2 g. of 5-aminotetrazole and 500 ml. of dry benzene was refluxed for 24 hours. The solid material which separated upon cooling was collected by filtration and purified by repeatedly dissolving in dilute sodium hydroxide, decolorizing with activated charcoal, and reprecipitating the material by acidification. After three such treatments, the product was dried over phosphorus pentoxide in vacuo at 100° C. for eight hours, giving 5-(3,5-diiodobenzamido)-tetrazole, M. P. 296–297.5° C. (dec.).

*Analysis.*—Calcd. for $C_8H_5I_2N_5O$: C, 21.78; I, 57.6; H, 1.14. Found: C, 21.64; I, 58.1; H, 1.61.

EXAMPLE 6

*5-(4-hydroxy-3,5-diiodobenzamido)tetrazole*

A mixture of 55 g. of 4-hydroxy-3,5-diiodobenzoic acid, 400 cc. of thionyl chloride and 150 cc. of petroleum ether (Skellysolve B) was refluxed for 26 hours. The solvent was removed in vacuo and the residue crystallized from petroleum ether (Skellysolve C), giving 37.8 g. of 4-hydroxy-3,5-diiodobenzoyl chloride, M. P. 109–111° C.

A suspension of 26.4 g. of 4-hydroxy-3,5-diiodobenzoyl chloride in 500 cc. of dry benzene was refluxed with stirring for two hours. The material which failed to dissolve (7.6 g.) was removed by filtration, 3.9 g. of 5-aminotetrazole was added to the filtrate, and the mixture was refluxed for 24 hours. The solid material which separated upon cooling was collected by filtration, dissolved in dilute sodium hydroxide solution, decolorized with activated charcoal, filtered and acidified with acetic acid. The material was further purified by repeating the treatment with sodium hydroxide, decolorizing and acidifying, and the product thus obtained was dried in a vacuum oven at 110° C., giving 5-(4-hydroxy-3,5-diiodobenzamido)tetrazole, M. P. 252–258° C. (dec.).

*Analysis.*—Calcd. for $C_8H_5I_2N_5O_2$: C, 21.02; H, 1.10; I, 55.5. Found: C, 21.13; H, 1.11; I, 55.2.

When administered intravenously as the sodium salt to cats at dose levels of 200 and 400 mg./kg. of body weight, 5-(4-hydroxy-3,5-diiodobenzamido)tetrazole caused the gall bladder to be outlined in X-ray photographs.

EXAMPLE 7

*5-(3,5-diiodo-4-methoxybenzamido)tetrazole*

A mixture of 62 g. of 3,5-diiodo-4-methoxybenzoic acid and 350 cc. of thionyl chloride was refluxed for three hours. The excess thionyl chloride was removed by distillation, and the residue was recrystallized from benzene and dried in a vacuum oven at 70° C. giving 44.1 g. of 3,5-diiodo-4-methoxybenzoyl chloride, M. P. 95–97° C.

5-aminotetrazole (5.0 g.) was added to a solution of 25 g. of 3,5-diiodo-4-methoxybenzoyl chloride in 500 cc. of dry benzene, and the mixture was refluxed for 24 hours. The solid material which separated upon cooling was collected by filtration, washed with water and dissolved in dilute sodium hydroxide. The sodium hydroxide solution was decolorized with activated charcoal, filtered, and the filtrate was acidified with acetic acid. The product was collected by filtration and the purification through the sodium salt was repeated twice. The product was dried in a vacuum oven at 110° C., giving 5-(3,5-diiodo-4-methoxybenzamido)tetrazole, M. P. 224.5–228° C. (dec.).

*Analysis.*—Calcd. for $C_9H_7I_2N_5O_2$: C, 22.95; H, 1.50; I, 53.9. Found: C, 23.10; H, 1.47; I, 53.8.

The substitution of a molar equivalent amount of 3,5-diiodo-4-ethoxybenzoic acid, M. P. 208–9° C., for the 3,5-diiodo-4-methoxybenzoic acid used above in Example 7, gives 5-(3,5-diiodo-4-ethoxybenzamido)tetrazole.

EXAMPLE 8

*5-(3,5-diiodo-2-methoxybenzamido)tetrazole*

A mixture of 15 g. of 3,5-diiodo-2-methoxybenzoic acid and 100 cc. of thionyl chloride was refluxed for one and one-half hours. The excess thionyl chloride was removed by distillation, and the residue was crystallized from petroleum ether (Skellysolve C), and the product was dried in a vacuum oven at 25° C., giving 15.4 g. of 3,5-diiodo-2-methoxybenzoyl chloride, M. P. 63–64° C.

5-aminotetrazole (2.8 g.) was added to a solution of 14.1 g. of 3,5-diiodo-2-methoxybenzoyl chloride in 300 cc. of dry benzene, and the mixture was refluxed for 24 hours. The mixture was cooled and the solid material which had formed was collected by filtration, washed with water and dissolved in dilute sodium hydroxide solution. The sodium hydroxide solution was filtered, decolorized with activated charcoal and acidified with acetic acid. The product was collected by filtration and dried in a vacuum oven at 110° C., giving 9 g. of 5-(3,5-diiodo-2-methoxybenzamido)tetrazole, M. P. 243–243.5° C. (dec.).

*Analysis.*—Calcd. for $C_9H_7I_2N_5O_2$: C, 22.95; H, 1.50; I, 53.9. Found: C, 23.13; H, 1.88; I, 53.6.

EXAMPLE 9

*5-(3,4-diiodobenzamido)tetrazole*

A mixture of 15 g. of 3,4-diiodobenzoic acid, 100 cc. of thionyl chloride and 100 cc. of petroleum ether (Skellysolve B) was refluxed for four hours. A small amount of insoluble material was filtered off, the excess solvents were removed by distillation, and the residue was recrystallized twice from petroleum ether (Skellysolve C) and dried in a vacuum oven at 40° C., giving 3,4-diiodobenzoyl chloride, M. P. 59–61° C.

5-aminotetrazole (2.1 g.) was added to a solution of 10 g. of 3,4-diiodobenzoyl chloride in 300 cc. of dry benzene, and the solution was refluxed for 24 hours. The mixture was cooled and the solid material which had separated was collected by filtration, washed with water and dissolved in dilute sodium hydroxide solution. The sodium hydroxide solution was filtered, the filtrate decolorized with activated charcoal and acidified with acetic acid. The product was collected by filtration and dried in a vacuum oven at 100° C., giving 5 g. of 5-(3,4-diiodobenzamido)tetrazole, M. P. 226.5–271.5° C. (dec.).

*Analysis.*—Calcd. for $C_8H_5I_2N_5O$: C, 21.79; H, 1.14; I, 57.56. Found: C, 21.89; H, 1.99; I, 57.00.

I claim:

1. A compound selected from the group consisting of compounds having the formula

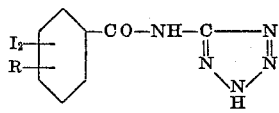

wherein R is selected from the class consisting of hydrogen, iodine, hydroxy and lower-alkoxy groups; and alkali metal, ammonium and amine salts thereof.

2. A compound having the formula

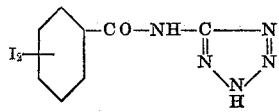

3. A compound having the formula

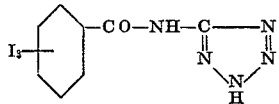

4. A compound having the formula

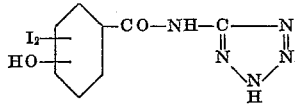

5. A compound having the formula

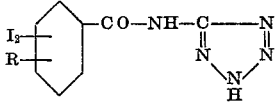

wherein R is a lower-alkoxy group.

6. A compound having the formula

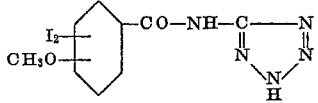

7. 5-(2,5-diiodobenzamido)tetrazole.
8. 5-(3,4,5-triiodobenzamido)tetrazole.
9. 5-(2-hydroxy-3,5-diiodobenzamido)tetrazole.
10. 5-(4-hydroxy-3,5-diiodobenzamido)tetrazole.
11. 5-(3,5-diiodo-4-methoxybenzamido)tetrazole.
12. A process for preparing a compound having the formula

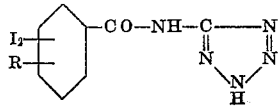

wherein R is selected from the class consisting of hydrogen, iodine, hydroxy and lower-alkoxy groups, which comprises heating an acid halide having the formula

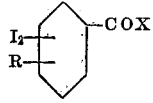

wherein X is selected from the class consisting of chlorine and bromine, with 5-aminotetrazole in an inert solvent.

13. A process for preparing a compound having the formula

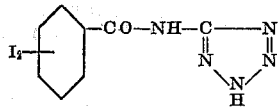

which comprises heating an acid chloride having the formula

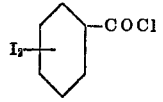

with 5-aminotetrazole in an inert solvent.

14. A process for preparing a compound having the formula

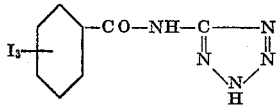

which comprises heating an acid chloride having the formula

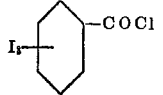

with 5-aminotetrazole in an inert solvent.

15. A process for preparing a compound having the formula

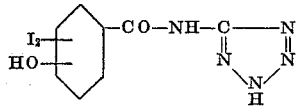

which comprises heating an acid chloride having the formula

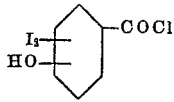

with 5-aminotetrazole in an inert solvent.

16. A process for preparing a compound having the formula

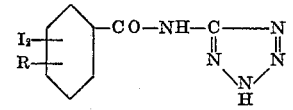

wherein R is a lower-alkoxy group, which comprises heating an acid chloride having the formula

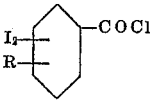

with 5-aminotetrazole in an inert solvent.

17. A process for preparing a compound having the formula

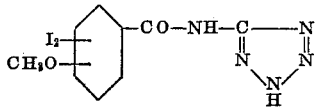

which comprises heating an acid chloride having the formula

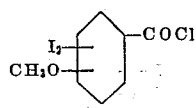

with 5-aminotetrazole in an inert solvent.

18. A process for preparing 5-(2,5-diiodobenzamido)-tetrazole, which comprises heating 2,5-diiodobenzoyl chloride with 5-aminotetrazole in an inert solvent.

19. A process for preparing 5-(3,4,5-triiodobenzamido)-tetrazole, which comprises heating 3,4,5-triiodobenzoyl chloride with 5-aminotetrazole in an inert solvent.

20. A process for preparing 5-(2-hydroxy-3,5-diiodobenzamido)tetrabole, which comprises heating 2-hydroxy-3,5-diiodobenzoyl chloride with 5-aminotetrazole in an inert solvent.

21. A process for preparing 5-(4-hydroxy-3,5-diiodobenzamido)tetrazole, which comprises heating 4-hydroxy-3,5-diiodobenzoyl chloride with 5-aminotetrazole in an inert solvent.

22. A process for preparing 5-(3,5-diiodo-4-methoxybenzamido)tetrazole, which comprises heating 3,5-diiodo-4-methoxybenzoyl chloride with 5-aminotetrazole in an inert solvent.

No references cited.